United States Patent
Boutelle et al.

(10) Patent No.: US 9,471,550 B2
(45) Date of Patent: Oct. 18, 2016

(54) METHOD AND APPARATUS FOR DOCUMENT CONVERSION WITH FONT METRICS ADJUSTMENT FOR FORMAT COMPATIBILITY

(71) Applicant: LinkedIn Corporation, Mountain View, CA (US)

(72) Inventors: Jonathan Boutelle, San Francisco, CA (US); Kapil Mohan Gupta, Delhi (IN); Michael Casey Brown, San Francisco, CA (US); Akash Agrawal, Gurgaon (IN); Christopher S. Ahlers, San Francisco, CA (US); Jeba Singh Emmanuel, Tirunelveli (IN); Ujjwal Singh Grover, New Delhi (IN)

(73) Assignee: LinkedIn Corporation, Mountain View, CA (US)

(*) Notice: Subject to any disclaimer, the term of this patent is extended or adjusted under 35 U.S.C. 154(b) by 365 days.

(21) Appl. No.: 13/653,214

(22) Filed: Oct. 16, 2012

(65) Prior Publication Data

US 2014/0108897 A1    Apr. 17, 2014

(51) Int. Cl.
*H03M 5/00* (2006.01)
*H03M 7/30* (2006.01)
*G06F 17/21* (2006.01)
*G06F 17/22* (2006.01)

(52) U.S. Cl.
CPC ........... *G06F 17/214* (2013.01); *G06F 17/227* (2013.01)

(58) Field of Classification Search
CPC . G06F 17/24; G06F 17/211; G06F 17/30017
USPC ........................................................ 715/201
See application file for complete search history.

(56) References Cited

U.S. PATENT DOCUMENTS

| | | | |
|---|---|---|---|
| 6,434,581 B1* | 8/2002 | Forcier | G06F 3/0488 715/273 |
| 6,565,609 B1* | 5/2003 | Sorge et al. | 715/234 |
| 8,707,164 B2* | 4/2014 | Adler, III | G06F 17/214 715/200 |
| 2004/0165786 A1* | 8/2004 | Zhang et al. | 382/276 |
| 2005/0257129 A1* | 11/2005 | Kreiner et al. | 715/500 |
| 2005/0268228 A1* | 12/2005 | Buser et al. | 715/523 |
| 2006/0170683 A1* | 8/2006 | Lin | 345/467 |
| 2006/0282769 A1* | 12/2006 | Bronstein | 715/526 |
| 2007/0250497 A1* | 10/2007 | Mansfield et al. | 707/5 |

(Continued)

*Primary Examiner* — Cesar Paula
*Assistant Examiner* — Luu-Phuong Nguyen
(74) *Attorney, Agent, or Firm* — Park, Vaughan, Fleming & Dowler LLP

(57) ABSTRACT

Method and apparatus for converting a document from a fixed-layout format (e.g., Microsoft Office, Adobe PDF) into a non-fixed layout format (e.g., HTML) portable to different platforms (e.g., desktop computers, tablet computer, smart phones) operating different operating systems (e.g., Microsoft Windows, Apple OS X) and different web browsers (e.g., Microsoft Internet Explorer, Apple Safari, Mozilla FireFox). In one stream, fonts are identified, extracted, and processed to enhance compatibility with the portable format. In another stream, textual content is extracted and processed to enhance compatibility and images are taken of non-textual content. These images are used as backgrounds in the output document, over which the textual content is rendered in the appropriate fonts, with sizing, spacing, positioning and/or other characteristics matching or closely approximating that of the original document. Error detection is applied by comparing images of the original document to corresponding images of the output document, to ensure high fidelity.

18 Claims, 5 Drawing Sheets

(56) References Cited

U.S. PATENT DOCUMENTS

| | | | |
|---|---|---|---|
| 2008/0238927 A1* | 10/2008 | Mansfield | 345/467 |
| 2009/0070415 A1* | 3/2009 | Kishi et al. | 709/203 |
| 2010/0013835 A1* | 1/2010 | Kuhns | 345/471 |
| 2010/0114923 A1* | 5/2010 | McVady et al. | 707/758 |
| 2011/0258535 A1* | 10/2011 | Adler et al. | 715/235 |
| 2012/0207390 A1* | 8/2012 | Sayers | G06T 11/60 382/176 |
| 2013/0067313 A1* | 3/2013 | Leguin et al. | 715/234 |
| 2013/0174010 A1* | 7/2013 | Le Chevalier et al. | 715/234 |
| 2013/0174017 A1* | 7/2013 | Richardson et al. | 715/234 |

* cited by examiner

METHOD AND APPARATUS FOR DOCUMENT CONVERSION WITH FONT METRICS ADJUSTMENT FOR FORMAT COMPATIBILITY

BACKGROUND

This invention relates to the fields of computer systems and data processing. More particularly, methods and apparatus are provided for converting a document from a fixed-layout format into a portable non-fixed layout format, with high fidelity.

Many office and presentation document software programs are designed to save documents in a manner that exactly preserves their page layout, size, font and positioning information, using a fixed layout. One example is the Portable Document Format (PDF) offered by Adobe Systems Incorporated.

Fixed-layout formats contrast with non-fixed layout formats, such as HTML (HyperText Markup Language), that do not preserve spacing, size, font and layout properties across the various programs and browsers that are used to display documents having such a format. A common example of a document that does not have a fixed layout is a typical webpage, which may appear visually different across different web browsers, operating systems and mobile devices, while containing all of the original semantic information.

Whereas a fixed-layout document may retain a great deal of data to allow a program displaying the document to adjust many characteristics of the document in order to present the document with the desired appearance, a web page typically does not. Although this may help reduce the size of the webpage, and therefore allow it to be transmitted faster, the appearance of the webpage when presented will depend on the web browser program that present it, the platform (e.g., a smart phone, a portable computer) and/or operating system of the platform.

Viewing or manipulating fixed-layout documents often requires installation of propriety software, which is not as widely or freely available as software that works with non-fixed layout documents. The requirement that readers of a fixed-layout document have special software makes it more difficult to share the document, because not everyone with whom the document should be shared may have the software. This can significantly limit the distribution of the document. In contrast, software for viewing a non-fixed layout document, such as a web browser for viewing HTML files, may be installed on just about every computer, tablet and smart phone that has Internet access.

Several attempts have been made to increase the portability of documents and, in particular, to make fixed-layout documents accessible via a browser.

One attempted solution involves the use of a browser plug-in, such as Adobe® Flash®, to render an original document (e.g., a Microsoft® Word document) in the desired format (e.g., HTML) by taking advantage of features not widely available in the output format. These solutions are generally not available on all computing and communication platforms. For example, many mobile telephones are limited to using standard HTML, or cannot operate the necessary browser plug-in for some other reason. Further, browser plug-ins often perform poorly with software designed for HTML, such as search engine spiders or screen readers for the visually impaired.

A second solution is to render the original document as a series of images. However, the resulting images will normally result in the loss of all semantic content. Thus, a viewer of the resulting images will not be able to search for or copy any textual content that was in the original document. In addition, the images often do not scale well to small or large sizes. For example, if the output image is relatively small and is stretched to appear larger, undesired visual artifacts may appear, text and objects may not look smooth and the overall aesthetic appeal may suffer. Further, a set of images representing the original document may occupy a lot of storage space, which can slow transmission and loading.

A third solution involves abandoning the original font and page layout information, and instead rendering only the most semantically relevant information, usually the text. Although the semantic content is retained, all aesthetics are lost, usually making the result visually unappealing. Such output will usually be unsuitable for advertisements, for documents used in a presentation and/or elsewhere.

SUMMARY

In some embodiments of the invention, methods and apparatus are provided for converting an input document having a fixed-layout format into a portable output format. In these embodiments, every page of the input document is processed to extract fonts, adjust font metrics to be compatible with and to display properly in a web browser, convert the fonts to compatible formats, extract text, process the text to allow it to be presented in the web browser substantially identically to how it appears in the input document, and to perform error detection on the corresponding page of the output document.

Because many input documents use document-specific encodings and character/glyph mappings, the encodings and mappings are converted be Unicode-compatible. This may require character and/or glyph encodings to be converted to UTF-8 (UCS (Universal Character Set) Transformation Format—8-bit) or some other comparable form.

Some fonts (e.g., those not embedded or not available on a target platform of the output document) may be replaced with exact or near duplicates, such as an appropriate form of a base-14 font. Adjustment of fonts' metrics will help ensure they are displayed with correct spacing, positioning, kerning and/or other characteristics, even though the output format (e.g., HTML) cannot make those types of adjustments, unlike a program used to create and/or present the input document (e.g., Adobe Acrobat, Microsoft Word).

In some embodiments, error detection may involve comparing an image of the input document to an image of the corresponding page of the output document. If the errors (e.g., percentage of pixels that are different) exceed a threshold, the corresponding page of the output may be replaced by the image of the page of the input document. However, text of the page may be injected into the output document so as to retain semantic content.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, methods and apparatus are provided for converting a document from a fixed-layout into a portable non-fixed layout format that is displayable by a web browser. Not only is the resulting document displayable by a web browser, but it will be displayed identically or very similar to the original document, even on different platforms (e.g., stationary computers, portable computers, smart phones), operating systems (e.g., Windows, OS X) and browsers (e.g., Internet Explorer, Safari, FireFox, Chrome). In addition, because all semantic content and context is retained, the end document can be searched (e.g., for text), text can be copied and manipulated, etc.

In these embodiments, the input document may be formatted according to a Microsoft Office program (e.g., Word, PowerPoint, Excel), Adobe's Portable Document Format (PDF), or some other fixed-layout format. The output document may be formatted in HTML (HyperText Markup Language) or some other markup language.

Figure 1:
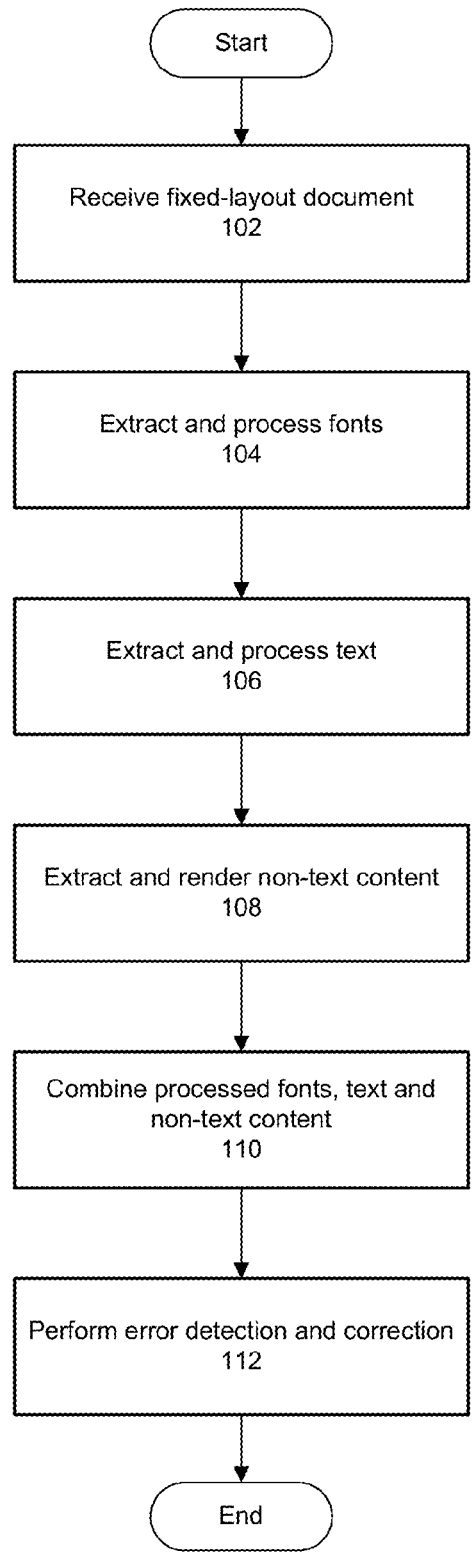
FIG. 1 is a flow chart demonstrating an overview of the processing of a fixed-layout document into a portable document having a non-fixed layout, according to some embodiments of the invention.

FIG. 1 is a flow chart demonstrating an overview of the processing of a fixed-layout document to produce a portable document having a non-fixed layout, according to some embodiments of the invention. Details of some operations of the method of FIG. 1 are provided further below.

In operation 102, the fixed-layout document is received. For example, it may be retrieved from storage and loaded into memory. In some implementations, the document may first be converted into a predetermined format (e.g., PDF) if not already in that format.

In operation 104, fonts are identified, and embedded fonts are extracted from the document, converted and/or normalized. The conversion process yields fonts that are compatible with the desired output format (e.g., HTML). For example, if the input document employed PostScript fonts, they will be converted to TrueType or some other format that can be rendered by a browser program. The normalization process adjusts font metrics to ensure correct positioning of font glyphs when rendered by the browser. Without normalization, a font converted from one type to another might not be displayed in the same position or with the same orientation as the original document.

In operation 106, text blocks within the document are identified, extracted and processed. A text block may be dissembled into smaller blocks so as to apply appropriate kerning, letter spacing, scaling and/or other adjustments that a browser cannot apply.

In operation 108, non-textual content is extracted and rendered as one or more images. Non-textual content may include things such as background images and graphical objects (e.g., images, icons, shapes). The images may be rendered on a per-page basis; that is, for each separate page of the original document, a separate set of images of the non-text content may be rendered.

In operation 110, the processed fonts and content are combined in the selected non-fixed layout format (e.g., HTML), while retaining the visual appearance of the original document. To preserve the appearance of the original document, each page's non-textual content (e.g., graphics) may be layered with the processed font and text to reproduce the original page, but in a portable form.

In operation 112, the quality or correctness of the output document is determined. In some embodiments, the document is rendered on one or more different platforms and operating systems, and captured as images. Each image (e.g., a page of the output document) is then compared to an image of the input document (e.g., the corresponding page).

The comparison may entail visual comparison of the images by a program (e.g., a pattern-matching program) and/or a human operator. If the differences exceed a permissible threshold, offending pages of the output document may be replaced with images of the pages of the original document. Alternatively, one or more portions (e.g., pages) of the output document may be re-generated so as to further process the fonts, text and/or other content, and thereby improve the output document. For example, additional modifications may be made to some font metrics, positioning of text may be adjusted, etc.

If an image of a page (or other portion) of the input document is used in place of a page (or other portion) of the output document, a transcript of the text of that page of the document may be injected into the output document. It may be embedded in a manner so that the text is logically located after the text of the previous page and before the text of the following page, and may be associated with the replacement page image, so as to retain some semantic context of the document page.

In some scenarios, some content or behavior of the original document may be so eccentric, or so unique to the program that generated the document, that it cannot be reproduced in the desired output format. In these situations, an operator of the method may be advised of the problem(s).

Additional details of some of the processing of the input document are provided in the following sections.

Font Stream

As described above, in some embodiments of the invention, the extraction, conversion and normalization of fonts comprises one stream of activity in the processing of a fixed-layout document to produce a portable document having a non-fixed layout format. Processing of the other stream, dealing with the content of the document, is described in the following section.

Figure 2:
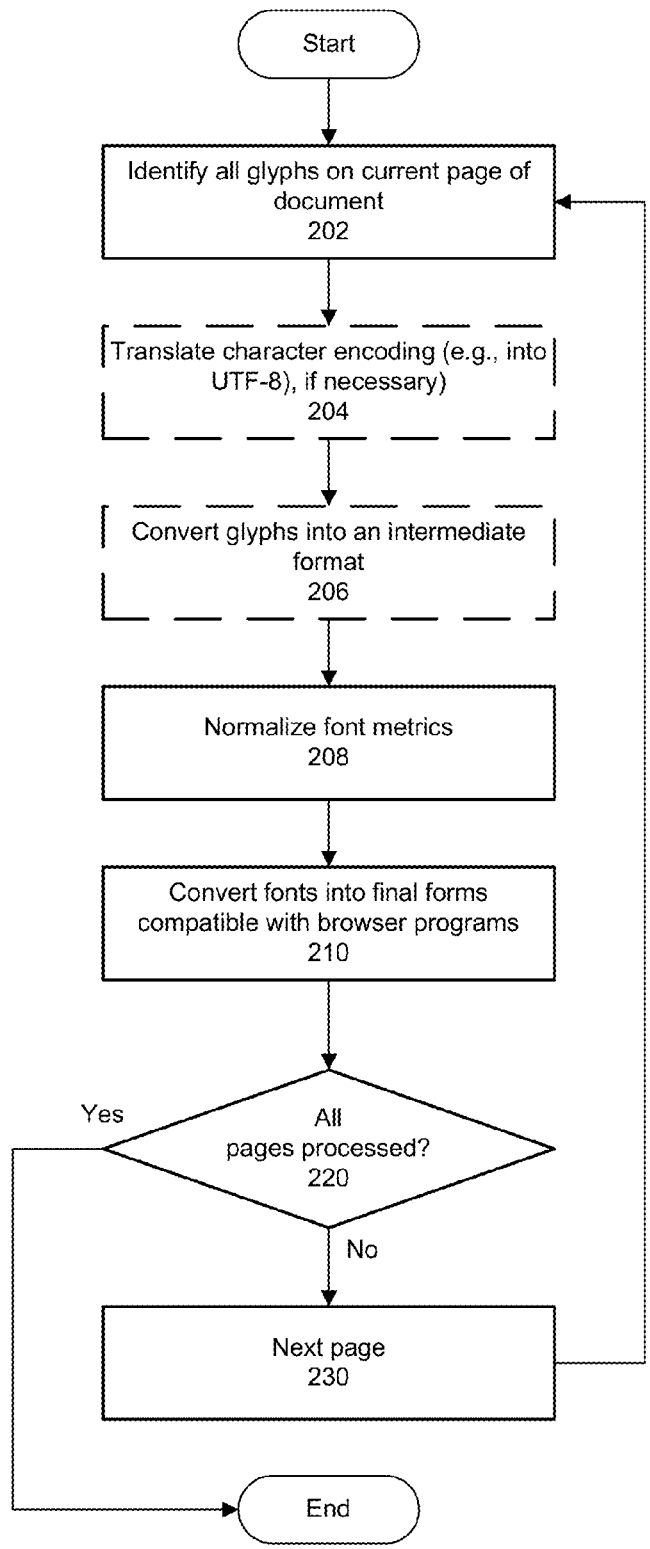
FIG. 2 is a flow chart demonstrating a method of processing the fonts of a fixed-layout document to prepare for inclusion in a portable document having a non-fixed layout, according to some embodiments of the invention.

FIG. 2 is a flow chart demonstrating a method of processing the fonts of a fixed-layout document to prepare them for inclusion in a portable document having a non-fixed layout, according to some embodiments of the invention. In these embodiments, fonts are extracted or identified from the original document on a page-by-page basis. Other processing (e.g., of text, of non-text content) may also be done page-by-page in the interest of maintaining fidelity with the pagination and appearance of the document.

In operation 202, processing of the first page or of a next page of the document begins with identifying every font and glyph used on the page. As one of ordinary skill in the art will recognize, "glyphs" are the shapes that constitute a font. Thus, the glyphs "a" and "b" and "c" are components of one font, while the glyphs "a" and "b" and "c" are corresponding components of a different font (assuming this sentence prints as intended).

As used herein, a "character" is a component of text. Therefore, every block of text in the document comprises one or more characters. Each character maps to a "glyph"— the shape with which the character is rendered—that will differ from font to font.

If the input document does not conveniently identify the glyphs employed on each page, some processing may be required in order to identify them. For example, it may be necessary to examine the text of the page to identify each character on the page, and determine which fonts those characters are to be rendered in, in order to identify all glyphs active on the page.

By extracting, processing and embedding only those glyphs that will actually be needed to render the page in the output document, the size of the document can be kept smaller than it would be if every glyph of every font were to be embedded (i.e., including those not used in the document).

For fonts identified or referenced in the input document, but not embedded, the same or a corresponding font may be loaded for use in the output document. For example, a referenced font may be replaced by a base 14 font, such as a form of Times or Times New Roman, Helvetica or Arial, or Courier. The system or apparatus on which the document conversion is performed may maintain a table identifying specific output fonts to use in place of identified or referenced fonts (i.e., fonts not embedded in the input document).

In some embodiments of the invention, once a font is identified in the input document, a mapping of the font's character codes to their corresponding glyphs is extracted. Such extraction will depend upon the type of font (e.g., OpenType, TrueType, PostScript), and may be performed using available software, such as FontForge, available at fontforge.org, or MuPDF, available at www.mupdf.com.

Because the character code is specific to the input document and/or font, and therefore not portable, the Unicode (e.g., UTF-8) value for each character code is looked up, based on the encoding of the document or font. This produces a mapping from Unicode to glyph identities, and can now be used in any manner supported by Unicode. The fonts' character identities are now equivalent to the Unicode values representing the correct glyphs, and will be able to be rendered in Unicode-aware contexts, such as a web browser program.

In summary, in some implementations, mappings from font- or document-specific character codes to glyph identities (which may display only in the original document), are converted into mappings from Unicode values to glyph identities.

In optional operation 204, and if not performed above in operation 202, character encoding of the original document is changed to a suitable format, such as UTF-8 (UCS (Universal Character Set) Transformation Format—8-bit), which can represent every character of the Unicode character set using no more than four 8-bit bytes per character. UTF-8 is one of the dominant character encodings for documents accessed via the World-Wide Web, if not the dominant encoding, and thus enhances the portability of the output document. In some embodiments of the invention, a Unicode-compatible encoding other than UTF-8 may be employed, such as UTF-16, UTF-32, etc.

In particular, and as described above, the input document may not be encoded in UTF-8, and a font embedded in the document may contain character mappings that are specific to that document. For example, a character code of 111 may represent 'A' in the document. If this encoding were directly imported to a web browser in a Unicode context, it would be displayed as 'o'. Therefore, the character code would be translated to 65, which in Unicode will produce 'A'.

From operation 204 (and/or operation 202), document-specific font files are converted into font files that can be embedded in any UTF-8 encoded document, and properly applied by a web browser.

In optional operation 206, the fonts identified in operation 202 are converted into an intermediate format for further processing, prior to conversion to a final format. An illustrative possibility for the intermediate font format is the Scalable Vector Graphics (SVG) format, which every (or nearly every) browser supports and can render directly. Advantageously, the SVG format provides all necessary functionality for placing every font glyph (and image) in the same location it occupied in the input document. In some embodiments of the invention, conversion of fonts into an intermediate format may be omitted, in which case they will be converted directly into their final format, in operation 206 or a later operation.

In operation 208, font normalization is performed. Whereas a font may have different metrics applied for every operating system or device platform it is displayed on, in this operation a font's metrics are normalized so that the font will display the same for every operating system and platform. Because HTML and/or other desired output formats do not allow manipulation of font metrics, this manipulation is done now, before the HTML document is assembled.

In many font files, such as those of TrueType and Embedded OpenType fonts, operating system-dependent metrics are stored for affecting how the font will be positioned when displayed within the corresponding operating system. These metrics may include windows ascent and descent (the maximum range of font glyphs above and below the baseline, in Microsoft Windows), typographic ascent and descent (for expressing line spacing of the font), typographic line gap (leading between lines), hhead ascent and descent (for line spacing) and line gap, and/or others.

Each metric will be interpreted in a manner dependent on the browser program displaying the document and the operating system on which the program executes. Therefore, without adjustment, the fonts would appear different on different platforms, and the document would appear different from the original, at least in some cases.

Normalization of a font starts with calculation of bounding boxes for all the font's glyphs. Individual metrics can then be calculated as follows:

```
linegap = 0;
ascender = top of box + hhead ascender; and
descender = bottom of box + hhead descender.
```

For compatibility purposes, the windows descent value is converted to a negative value; the hhead ascender and descender remain as they are.

In operation 210, the extracted fonts (or the normalized intermediate fonts if operation 206 was applied) are converted into fonts compatible with the target output format (e.g., HTML). Illustratively, these final fonts may be Embedded OpenType fonts (for documents destined for Microsoft's Internet Explorer), TrueType fonts (for documents for other browsers) or other web-safe fonts.

In operation 220, if all pages have been processed for their fonts, the illustrated method ends; otherwise, the method returns to operation 230 to select the next page and continue. Note that mappings created for one page (e.g., mappings from text characters to glyphs) may be reused for another page.

The conversion process of FIG. 2 may target just the font glyphs that are actually used in the original document or on the current page, in order to help limit the size of the output document. Glyphs that won't be displayed in the document need not be included (embedded) in it. The conversion process may include compression of the converted fonts.
Content Stream The content of the document, including textual and non-textual content, is processed separately from the fonts, but may be done in parallel.

Figure 3:
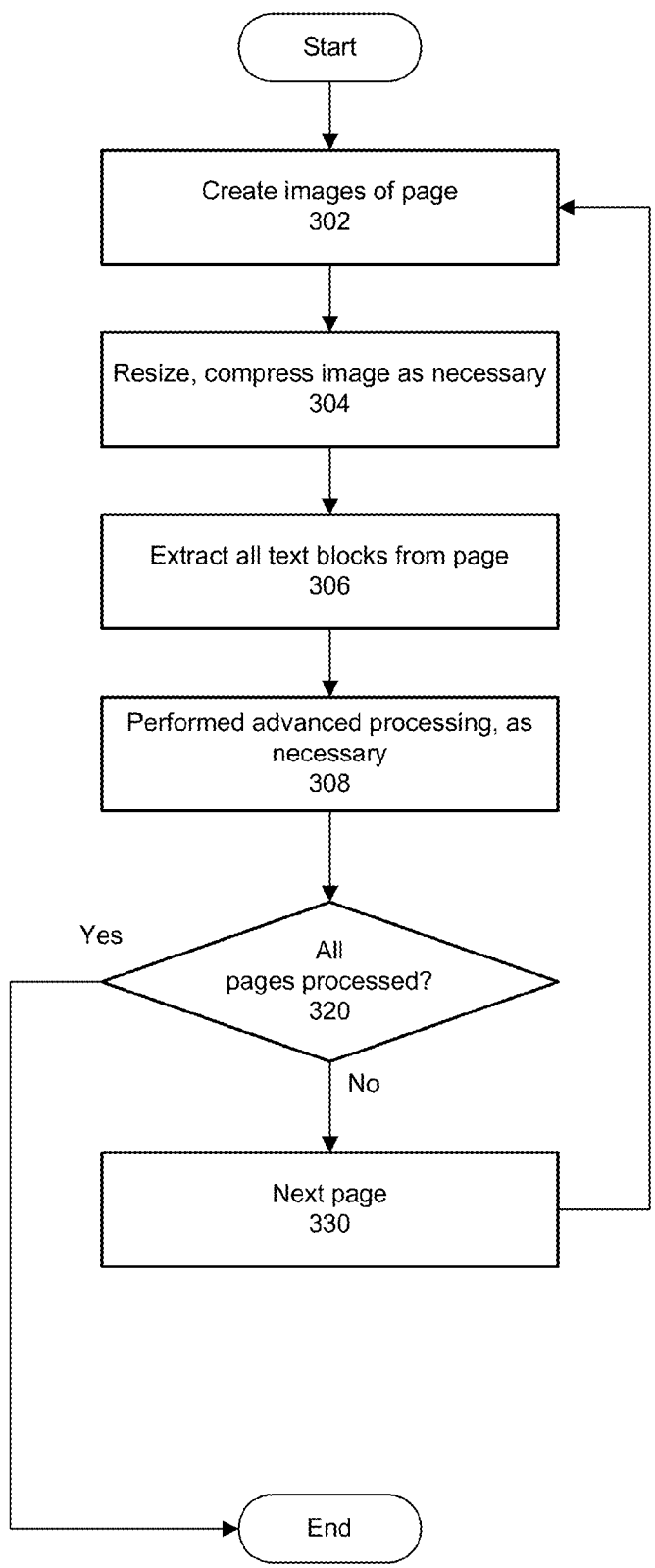
FIG. 3 is a flow chart demonstrating a method of processing the content of a fixed-layout document to prepare for inclusion in a portable document having a non-fixed layout, according to some embodiments of the invention.

FIG. 3 is a flow chart demonstrating a method of processing the content of a fixed-layout document to prepare it for inclusion in a portable document having a non-fixed layout, according to some embodiments of the invention. As with the fonts, the content may be processed on a page-by-page, again to enhance the fidelity of the output document with respect to the original document.

In operation 302, processing of the first (or next) page commences by taking two images of the page. One image will be used for error detection, as described in the following section, and includes all content. The other image is used to capture the non-textual content of the page, and will serve as a background for the textual content when rendered in the output document.

The first image, for error detection, may be formed by rasterizing the entire page, including all content. The second image may use a version of the same software that has been modified to skip the text or simply not render it. In some implementations, the program used to capture the images may be an open-source program for rasterizing PDF documents.

In operation 304, the background image captured in operation 302 is resized and/or compressed to better suit multiple target platforms on which the output document will be displayed. For example, the image may be made smaller for display on a smart phone, or may be made larger for display on a large monitor. In some or all cases, compression is applied to reduce the output file size.

In operation 306, individual text blocks are extracted from the document page. Each text block may comprise any number of characters.

While text blocks are being extracted, the encoding of the text is converted, if necessary, to a format compatible with web browsers, such as UTF-8. Whereas operation 204 of FIG. 2 may have translated font character codes to correspond to UTF-8 (or other appropriate format) to make them Unicode-compatible, here we translate the character codes of the document's text to make them Unicode-compatible as well.

For example, a text block in the input document may include 'GDXG', with some arbitrary encoding that corresponds to glyphs in the embedded font to produce the desired output. In operation 306, 'GDXG' is translated into a Unicode-compatible encoding of the desired glyphs, such as 'TEST', which will be processed correctly by a presentation program (e.g., a web browser).

Yet further, hyperlinks, animations and/or other metadata are converted into appropriate HTML objects.

In operation 308, advanced processing is performed as needed on the text. For example, if kerning or letter spacing were implemented in the original document, the processed text may be adjusted accordingly.

This may require a block of text to be dissembled into multiple smaller blocks, perhaps even to the level of comprising a single character. To preserve the positioning of the original document, these sub-blocks will be adjusted according to the font metrics already calculated (see the preceding section). The glyphs placed in the output document will thus have the same positioning and spacing as the input document.

For example, in the input document, a single word such as "Think" may be broken into the following groups: 'T', 'h', 'i', 'n' and 'k'. Exact horizontal positioning of each group is then adjusted based on letter spacing and kerning data to render the font in the most aesthetically pleasing manner. More specifically, the start position of the word 'Think' is known (e.g., from the end position of the previous text, by specific location instructions), the letter spacing and width of the glyph are known, and other relevant font metrics (if any) are known. Thus, by applying the applicable data to each individual group, the word can be positioned as intended.

To continue with this example, whereas the input document may have rendered the word 'Think' using the following code:

<span style='top:10%;left:10%;'>Think</span> advanced processing will break the code into the following:

```
<span style='top:10%;left:10%;'>T</span>
<span style='top:10.08%;left:10%;'>h</span>
<span style='top:10.16%;left:10%;'>i</span>
<span style='top:10.24%;left:10%;'>n</span>
<span style='top:10.32%;left:10%;'>k</span>
```

Because some web browsers tend to ignore kerning and letter spacing data, without these adjustments the output document would appear different from the input. By making the adjustments before generating the HTML output, the word 'Think' will be displayed with fidelity to the input document.

In operation 320, if all pages have been processed for their content, the illustrated method ends; until then, the method returns to operation 330 to select the next page and continue.
Assembly and Error Detection After the fonts and content are processed according to the preceding sections, the output document can be assembled and examined for correctness.

Figure 4:
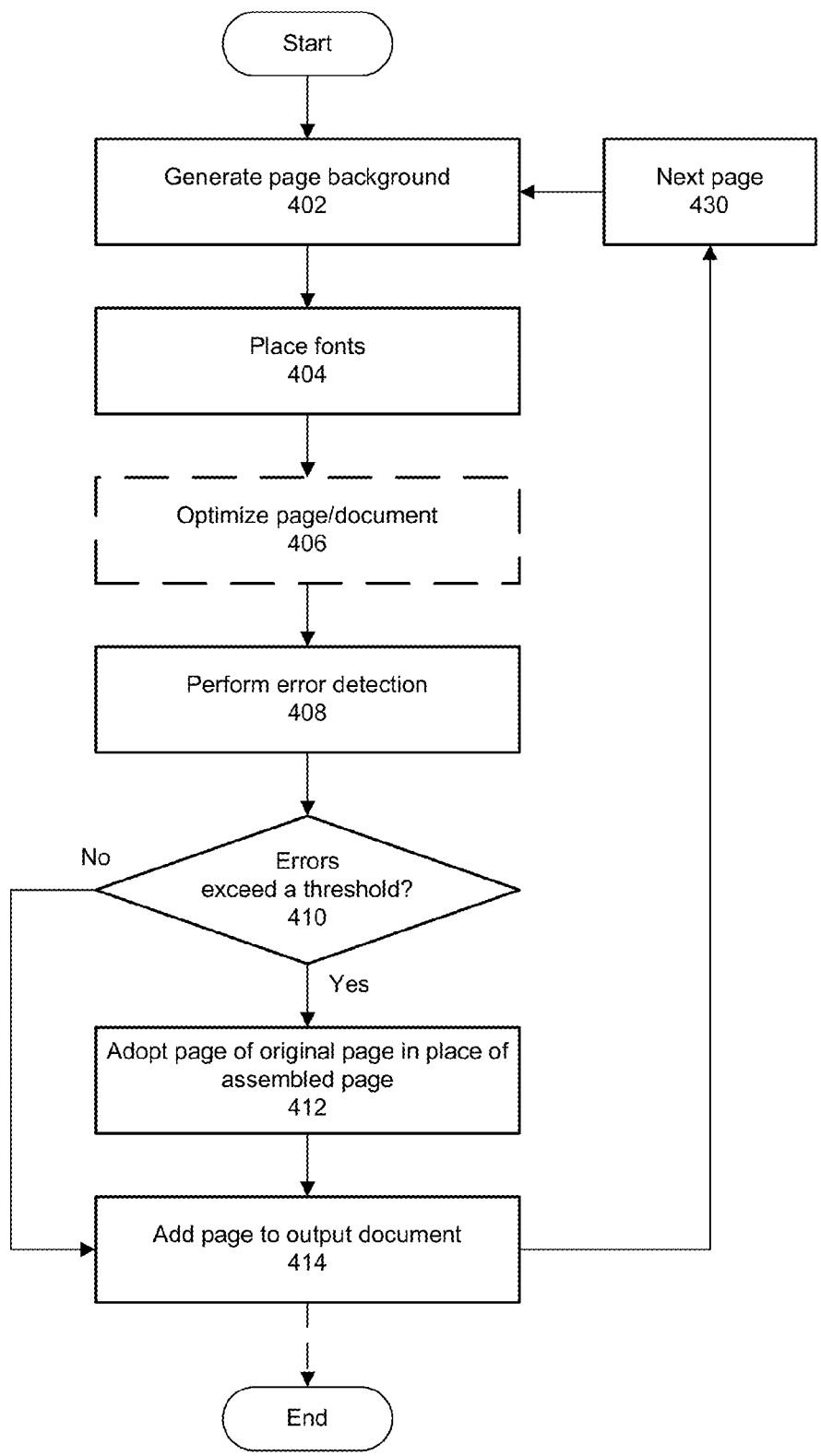
FIG. 4 is a flow chart demonstrating a method of finalizing the conversion of a fixed-layout document into a portable document having a non-fixed layout, according to some embodiments of the invention.

FIG. 4 is a flow chart demonstrating a method of finalizing the conversion of a fixed-layout document into a portable document having a non-fixed layout, according to some embodiments of the invention.

In operation 402, the background of the first (or current) page is laid down, using the image of non-text content of the corresponding page of the input document.

In operation 404, glyphs of fonts used for the corresponding page are placed in accordance with the adjust font metrics, sizing and positioning calculated above. The fonts may be embedded in the document or, if it is certain the fonts will be available on a computer or communication device that will display the output document, they may simply be referenced.

In optional operation 406, the resulting page may be optimized to improve its fidelity with the original and/or to make loading or transmission of the page (or the overall document) faster. For example, to reduce the number of objects that are referenced within the page but which reside on a remote server, background images that are simple (e.g., of single color) may be replaced with embedded HTML objects. This may require setting a background color in the HTML output.

Another possible optimization groups together multiple fonts extracted from the input document. In some embodiments of the invention, for each page of the input document a separate file is assembled to contain the font(s) on that page, and that file would need to be transferred with the output document. For fonts used on multiple pages, the same glyphs would therefore have to be downloaded multiple times in different files.

Therefore, an optimization may be applied to reduce the number of font files by grouping the fonts of multiple pages (e.g., 5, 10) into a single file. This requires fewer font files to be downloaded, and also results in less repetition, each file only needs to contain one copy of each glyph used on the corresponding pages of the output document.

The resulting markup language will be scalable so that the page can be displayed on small or large screens without notable deviation from the appearance of the input document.

In operation 408, error detection is performed. Illustratively, this operation may entail comparing an image of the page as it has been constructed, which may be termed the "output page image," with an image of the corresponding page of the input document (e.g., from operation 302 of FIG. 3), which may be termed the "input page image."

In some embodiments of the invention, the following process is performed. First, in both the input and output page images, text region boundaries are calculated or identified; each region is mapped to the font size for text in the region. A given text region may comprise only text having one font size, or may comprise text of multiple font sizes. In some embodiments of the invention, text region boundaries are only computed for the input page image; the same boundaries are then applied to the output page image.

Second, both input and output page images are converted to grayscale. Third, pixels inside the text regions are blurred, with the amount of blurring possibly being proportional to the (average) font size of the region. In an illustrative implementation, blurring may involve running a box filter with a kernel width between approximately 3 and approximately 11. No blurring is performed outside the text region boundaries.

Fourth, the images are diffed (differenced), and the absolute value of the difference is captured. The diffed image is then thresholded at 20% of 255, where the brightness or intensity of the image can be measured on a scale from 0 to 255. In particular, any pixels in the diffed image having a brightness/intensity equal to or above the threshold are set to 255 (white); pixels below are set to 0 (black). This provides a binary image, wherein every pixel is either white or black.

Then, a 3×3 median filter is applied to the thresholded output, to remove any isolated error pixels before calculation of the error score. Finally, the error score is calculated as (number of white pixels)÷(total number of pixels). Thus, the white pixels in the diffed and thresholded image represent errors.

In some embodiments of the invention, error detection involves a different process, as follows. First, the input and output page images are converted to grayscale. Then a Gaussian blur with a radius of 5 pixels and a standard deviation of 3 is applied.

Next, the images are diffed and a 20% threshold applied. Pixels in the difference image that are less than 20% of the pixel range (e.g., 0 to 255) are not counted as error pixels and are set to black; the remaining pixels are marked as error pixels and set to white. The error score is calculated the same way as above.

In operation 410, if the number and/or types of differences between the images exceed a limit, the method continues at operation 412; otherwise, the method advances to operation 414.

In different embodiments of the invention, different limits may be placed on the amount or extent of acceptable error. In an illustrative implementation, an error score reflecting errors in more than 0.01% of the pixels of the output page image may cause the output page to be abandoned and replaced with an image of the input page.

In operation 412, the assembled page is abandoned and the image of the corresponding page of the input document is used in its place. As described previously, this may prevent the text and/or other content of the page from being searched or copied. However, in some embodiments, text found on the page may be injected into the output document so as to be searchable, and may be positioned relative to text of preceding and/or following pages.

In operation 414, the selected page (i.e., the assembled page or the image of the original document) is added to the output document.

If all pages have been processed for their content, the illustrated method ends; until then, the method continues from operation 414 to operation 440 to select the next page and continue.

Document Conversion Apparatus

Figure 5:
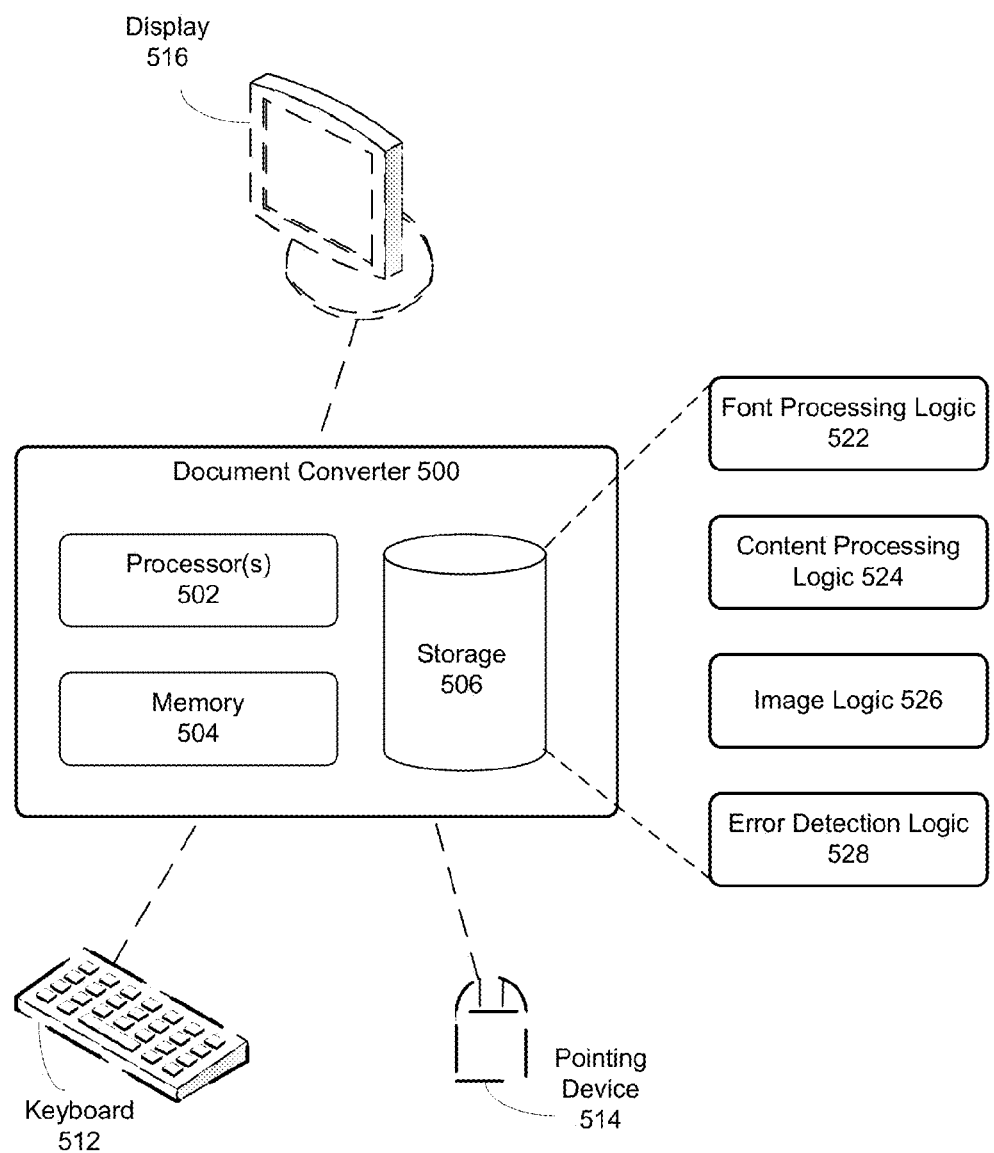
FIG. 5 is a block diagram of an apparatus for converting a fixed-layout document into a portable document having a non-fixed layout, according to some embodiments of the invention.

FIG. 5 is a block diagram of an apparatus for converting a fixed-layout document into a portable, non-fixed format, according to some embodiments of the invention.

Document converter 500 of FIG. 5 comprises processor(s) 502, memory 504 and storage 506, which may comprise one or more optical and/or magnetic storage components. Document converter 500 may be coupled (permanently or transiently) to keyboard 512, pointing device 514 and display 516.

Storage 506 of the document converter stores logic that may be loaded into memory 504 for execution by processor 502. Such logic includes font processing logic 522, content processing logic 524, image logic 526 and error detection logic 528. In other embodiments of the invention, any or all of these logic modules may be combined or divided to aggregate or separate their functionality as desired.

Font processing logic 522 comprises processor-executable instructions for locating, identifying and extracting fonts of an input document (or set of documents), processing them and inserting the same or corresponding fonts into the output document. As described above, processing the fonts may involve converting them from one type to another, changing a font to one that is (or will be) available on a target platform, adjusting metrics and/or other operations.

Content processing logic 524 comprises processor-executable instructions for locating, identifying and extracting text and non-text content of the input document, processing textual content and adding it to the output document. The processing of text may include adjusting size, spacing and/or other characteristics so as to maintain, in the output document, the aesthetics of the input document.

Image logic 526 comprises processor-executable instructions for capturing images. In particular, logic 526 may capture images of pages of the input document for later error detection, images of the non-text content of the input document for inclusion in the output document, and images of an assembled document help with error detection.

Error detection logic 528 comprises processor-executable instructions for determining the fidelity of the output document (or pages of the output document) to the input document (or corresponding pages). As described above, if the output document cannot be assembled in the desired format (e.g., HTML) while maintaining the appearance of the original document and enabling access to the textual content, offending pages (or other portions) may be omitted and replaced with corresponding images.

The environment in which some embodiments of the invention are executed may incorporate a general-purpose computer or a special-purpose device such as a hand-held computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

Methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, methods and processes described herein can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of converting an input document having a fixed-layout into a portable format, the method comprising, for each page of the input document:
   extracting a font used on the page;
   converting the extracted font into a format compatible with a web browser program, wherein said converting comprises:
      converting the extracted font into an intermediate font format;
      normalizing the intermediate font format by adjusting metrics of the intermediate font format to cause glyphs in a final font to have the same positioning and line spacing as the input document, based on characteristics of an operating system within which the final font will be displayed, wherein said adjusting includes, for said line spacing:
         keeping hhead ascent and descent values of the intermediate font format as they appear in the extracted font; and
         converting windows descent values of the intermediate font format to negative values; and
      converting the normalized intermediate font format into the final font;
   extracting text from the page;
   rendering content of the page, other than the font and the text, as one or more content images;
   storing the final font, the extracted text and the one or more content images;
   combining the final font, the extracted text and the one or more content images as a corresponding page of an output document formatted according to a markup language compatible with the web browser program;
   comparing an image of the page of the input document to an image of the corresponding page of the output document to generate an error score; and
   if the error score exceeds a threshold, replacing the corresponding page of the output document with an image of the page of the input document.

2. The method of claim 1, wherein the markup language is HTML (HyperText Markup Language).

3. The method of claim 1, wherein said extracting a font comprises:
   identifying every font used in a first page of the input document; and
   identifying every glyph used in every identified font.

4. The method of claim 1, wherein said extracting a font comprises:
   extracting a mapping of document-specific character codes used in a first page of the input document to corresponding glyphs; and
   replacing the document-specific character codes with Unicode-compatible character codes.

5. The method of claim 4, wherein the Unicode-compatible character codes are UTF-8 (Universal Character Set Transformation Format—8-bit) code points.

6. The method of claim 1, wherein said extracting a font comprises:
   converting a document-specific font file into a format compatible with UTF-8 (Universal Character Set Transformation Format—8-bit).

7. The method of claim 1, wherein said converting the font comprises replacing the font with one of:
   a TrueType font; and
   an Embedded OpenType font.

8. The method of claim 7, wherein said converting the font comprises:
   converting the font into a scalable vector graphics format prior to said replacing.

9. The method of claim 1, wherein said adjusting metrics comprises:
   calculating a bounding box for each glyph of each font used in the page;
   setting an ascent value equal to a sum of a position of a top of the bounding box plus the head ascent; and
   setting a descent value equal to a sum of a position of a bottom of the bounding box plus the head descent.

10. The method of claim 1, wherein said extracting text from the page comprises:
    extracting character codes in the page used to represent text; and replacing the extracted character codes with Unicode-compatible character codes.

11. The method of claim 1, wherein said extracting text from the page comprises:
extracting multiple blocks of text in the page; and
subdividing a first extracted block of text into multiple sub-blocks of text.

12. The method of claim 11, further comprising:
positioning the multiple sub-blocks of text in the corresponding page of the output document so as to be displayed by the web browser substantially identically to a display of the first extracted block of text in the page of the input document.

13. The method of claim 1, wherein:
said error score measures a percentage of pixels of the image of the corresponding page of the output document that differ from the image of the page of the input document; and
the threshold for the error score is approximately 0.01%.

14. The method of claim 1, wherein said replacing the corresponding page of the output document with an image of the page of the input document comprises:
embedding text of the page of the input document within the output document so as to be searchable by a viewer of the output document.

15. The method of claim 1, further comprising optimizing the output document by:
combining two or more font files assembled from the extracted fonts into a single font file.

16. The method of claim 1, further comprising optimizing the output document by:
replacing one or more background images in the input document with corresponding HTML objects.

17. A non-transitory computer-readable medium storing instructions that, when executed by a processor, cause the processor to perform a method of converting an input document having a fixed-layout into a portable format, the method comprising, for each page of the input document:
extracting a font used on the page;
converting the extracted font into a format compatible with a web browser program, wherein said converting comprises:
converting the extracted font into an intermediate font format;
normalizing the intermediate font format by adjusting metrics of the intermediate font format to cause glyphs in a final font to have the same positioning and line spacing as the input document, based on characteristics of an operating system within which the final font will be displayed, wherein said adjusting includes, for said line spacing:
keeping head ascent and descent values of the intermediate font format as they appear in the extracted font; and
converting windows descent values of the intermediate font format to negative values; and
converting the normalized intermediate font format into the final font;
extracting text from the page;
rendering content of the page, other than the font and the text, as one or more content images;
storing the final font, the extracted text and the one or more content images;
combining the final font, the extracted text and the one or more content images as a corresponding page of an output document formatted according to a markup language compatible with the web browser program;
visually comparing an image of the page of the input document to an image of the corresponding page of the output document to generate an error score; and
if the error score exceeds a threshold, replacing the corresponding page of the output document with an image of the page of the input document.

18. An apparatus for converting a fixed-layout input document into a non-fixed format output document, comprising:
a display device for displaying documents;
a processor;
font-processing logic for:
identifying a font used in the input document;
converting the identified font into a format compatible with a web browser program, wherein said converting comprises:
converting the extracted font into an intermediate font format;
normalizing the intermediate font format by adjusting metrics of the intermediate font format to cause glyphs in a final font to have the same positioning and line spacing as the input document, based on characteristics of an operating system within which the final font will be displayed, wherein said adjusting includes, for said line spacing:
keeping head ascent and descent values of the intermediate font format as they appear in the extracted font; and
converting windows descent values of the intermediate font format to negative values; and
converting the normalized intermediate font format into the final font;
content-processing logic for:
copying textual content of the input document; and
adjusting the textual content;
image logic for:
capturing images of full pages of a document; and
capturing images of non-textual content of pages of the input document; and
error detection logic for:
comparing a page of the output document to a corresponding page of the input document; and
discarding the page of the output document if it differs from the corresponding page of the input document by more than a threshold.

* * * * *